United States Patent [19]
Osborne et al.

[11] Patent Number: 5,860,006
[45] Date of Patent: *Jan. 12, 1999

[54] PROCESSOR INDEPENDENT NETWORK OPERATING SYSTEM LOADABLE MODULES

[75] Inventors: James W. Osborne, San Jose; Michael D. McDaniel, Sunnyvale, both of Calif.

[73] Assignee: Apple Computer, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 528,913
[22] Filed: Sep. 15, 1995
[51] Int. Cl.⁶ .................................................. G06F 9/44
[52] U.S. Cl. ...................... 395/702; 395/703; 395/705; 395/706
[58] Field of Search ............................ 395/500, 705, 395/706, 708, 702, 703, 712, 701

[56] References Cited

U.S. PATENT DOCUMENTS

| | | | |
|---|---|---|---|
| 4,853,872 | 8/1989 | Shimoi | 395/705 |
| 5,313,635 | 5/1994 | Ishizuka et al. | 395/705 |
| 5,583,983 | 12/1996 | Schmitter | 395/705 |
| 5,586,323 | 12/1996 | Koizumi et al. | 395/705 |

*Primary Examiner*—Kevin A. Kriess
*Attorney, Agent, or Firm*—Blakely, Sokoloff, Taylor & Zafman

[57] ABSTRACT

A PowerPC based Network Operating System Loadable Module (NOSLM) is concatenated onto an Intel-based NOSLM and offsets are adjusted to account for the size of the Intel-based NOSLM. The resulting enlarged NOSLM appears as a typical Intel-based NOSLM to Intel-based servers. When the enlarged NOSLM is loaded by PowerPC-based servers, the offsets are used to point the server to the beginning of the PowerPC-based NOSLM code and the Intel-based NOSLM is interpreted as a machine-specific header.

14 Claims, 5 Drawing Sheets

PROCESSOR INDEPENDENT NETWORK OPERATING SYSTEM LOADABLE MODULES

BACKGROUND OF THE INVENTION

1. Field of Invention

The present invention relates to the field of Network Operating System Loadable Modules used in network servers running with a network operating system such as NetWare. In particular, the present invention describes methods for creating Network Operating System Loadable Modules capable of being loaded on network servers utilizing various processors.

2. Description of Related Art

Networking is one of the major information technology trends of the 1990's. Network Operating Systems (NOSs), once merely a solution for allowing a number of personal computers to use a common printer, are the backbone of such systems, and provide for the sharing of resources and data across a network. Traditional NOSs relied on a central dedicated server which held all of the network common data files and provided access to shared network resources. More modern NOSs, however, interwork across a network.

A multitude of NOSs exist in the art. One well-known NOS is the NetWare collection, available from Novell Corporation of Provost, Utah Although several versions of NetWare operating systems are available, each share two common features: the NetWare shell (software running in the client computer which controls access to the network and its resources) and the core NetWare operating system (running in one or more computer system servers and managing and controlling access to the network common data and resources).

It is known in the art that if a network operating system were to provide for all conceivable functions, it would require more memory than is realistically available on a typical server. Tailoring the NOS to the specific network environment in which it is operating by only adding those NOS functions which are appropriate overcomes this problem. The approach adopted in the prior art has been to supply core NOSs that handle essential server operating functions and provide "hooks" for additional applications required by individual networks. In the early development of these NOSs, the applications which were built on these "hooks" were generically known as value-added processes (VAPs). A variety of VAPs, including communication services, gateway services, and offload processing operations have become available.

More recently, with the development of new NOSs running on new processors, VAPs have been replaced by Network Operating System Loadable Modules (NOSLMs). Like VAPs, NOSLMs are integral components of a network, providing additional functions not supported by the core NOS. NOSLMs, as second generation products, contain features that were not previously available in VAPs. For example, NOSLMs can be easily unloaded and therefore do not take up any memory when not required.

As networks grow in size and complexity, they generally require more than one server. For example, dedicated print servers might be used so that separate file servers need not bother with print requests. It is equally apparent that, as technology advances are made, the various servers supporting a network might be based on different types of processors. For example, some servers might be based on x86/Pentium processors, available from Intel Corporation of Santa Clara, Calif., while others are based on PowerPC processors, available from Motorola, Inc. of Schaumberg, Ill. This presents a problem in that NOSLMs designed for use for use on Intel-based servers (i.e., those servers utilizing an x86/Pentium processor) are not compatible with servers based on the PowerPC. Thus, the owner of a network comprising both types of servers is forced to purchase two copies (one for the Intel-based servers and one for the PowerPC-based servers) of the same NOSLM if that NOSLM is to be resident on both types of servers. A related problem, this time from the NOSLM vendor's point of view, is that two sets of packaging, inventories, etc. must be maintained.

The incompatibility problem arises because of the manner in which NOSLMs are produced. As is familiar to those skilled in the art, NOSLMs are generally written in a high-level source code. The server processor cannot understand the source code version of the program, so the source code is compiled into object code for loading on the server. The object code for an Intel-based server will be different than that for a PowerPC-based server. Hence, the NOSLM which is compiled for the Intel-based server cannot be used on the PowerPC-based server and vice-versa. While enlarged computer programs containing compiled code for two different types of processors have existed, such programs are not available for network loadable modules for network operating systems. Accordingly, there exists a need to provide a method of generating a single NOSLM which can be loaded on either type of server.

SUMMARY OF THE INVENTION

The present invention, in one embodiment, provides a method of producing an NOSLM which can be loaded by either an Intel-based server or a PowerPC-based server. This processor independent NOSLM is produced, in general, by concatenating the PowerPC-based NOSLM onto the Intel-based NOSLM to produce a single file. Offset pointers in the headers of the Power-PC NOSLM are adjusted so that the enlarged NOSLM appears as a regular PowerPC NOSLM to the server when the NOSLM is loaded. Similarly, the enlarged NOSLM appears as an ordinary Intel-based NOSLM to an Intel-based server.

A second embodiment of the present invention avoids the need to reset the offset pointers in the PowerPC NOSLM by producing the enlarged NOSLM during the linking process. The Intel-based object code is linked at the same time as the PowerPC-based object code, thereby producing one enlarged NOSLM. The header information, including the offset pointers, is created for the first time during linking and so no alteration of existing headers is required.

According to another embodiment of the present invention, a computer readable medium contains a computer program which includes executable code for a first processor and executable code for a second processor. The computer program comprises a first network loadable module (NOSLM) for an operating system, where the first NOSLM is executable on the first processor and the computer program also comprises a second NOSLM for the operating system where the second NOSLM is executable on the second processor and is concatenated with the first NOSLM to produce a single computer file which may be copied or moved as one file from one computer storage medium to another computer storage medium.

In another embodiment of the present invention, a network server is provided. The network server comprises a computer system which is coupled to other computer systems in a conventional computer network using conventional computer technology. The network server comprises a processor and memory coupled to the processor through a bus. The server further comprises a computer readable medium, such as a conventional mass storage device (e.g., hard disk drives), which is coupled to the memory, usually through the bus. The computer readable medium stores a computer program having executable code for a first processor and having executable code for a second processor, where the processor which is coupled to the memory may be either the first processor or the second processor. The computer program comprises a first network loadable module (NOSLM) for an operating system and a second NOSLM for the operating system; the first NOSLM and the second NOSLM are concatenated to form a single file which may be copied or moved as one file from one computer storage medium to another computer storage medium.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

In the following description, certain specific details are set forth in order to provide a thorough understanding of the present invention. However, upon reviewing this specification, it will be apparent to those skilled in the art that the methods of the present invention may be practiced without these specific details. In other instances, well known structures and techniques have not been shown or described in detail in order not to obscure the present invention.

Network Operating System Loadable Modules (NOSLMs) are used by network servers to provide additional functions not supported by the core NOS. In one example, the network operating system is Novell's NetWare, and the NOSLM is a NetWare NOSLM. In this fashion, the NOS is tailored to the specific network environment in which it is operating. The use of NOSLMs conserves server memory since the NOSLMs are only loaded as required by user requests.

Figure 1:
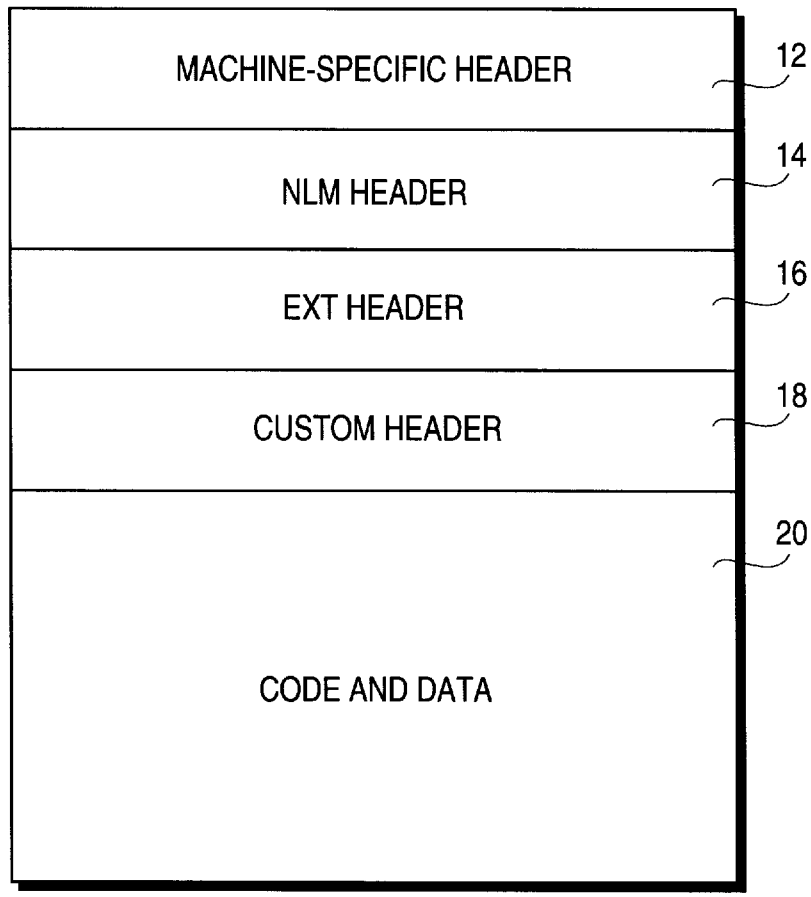
FIG. 1 illustrates a typical NetWare Loadable Module.

FIG. 1 illustrates a typical NOSLM 10. The NOSLM 10 is broken up into a variety of headers 12–18 and the actual code and data field 20. Among the headers are a machine-specific header 12, an NOSLM header 14, an extension header 16 and a custom header 18. As an NOSLM is loaded by a server, offset pointers in the headers direct the processor's program counter to the appropriate locations in the code and data field 20.

Figure 2:
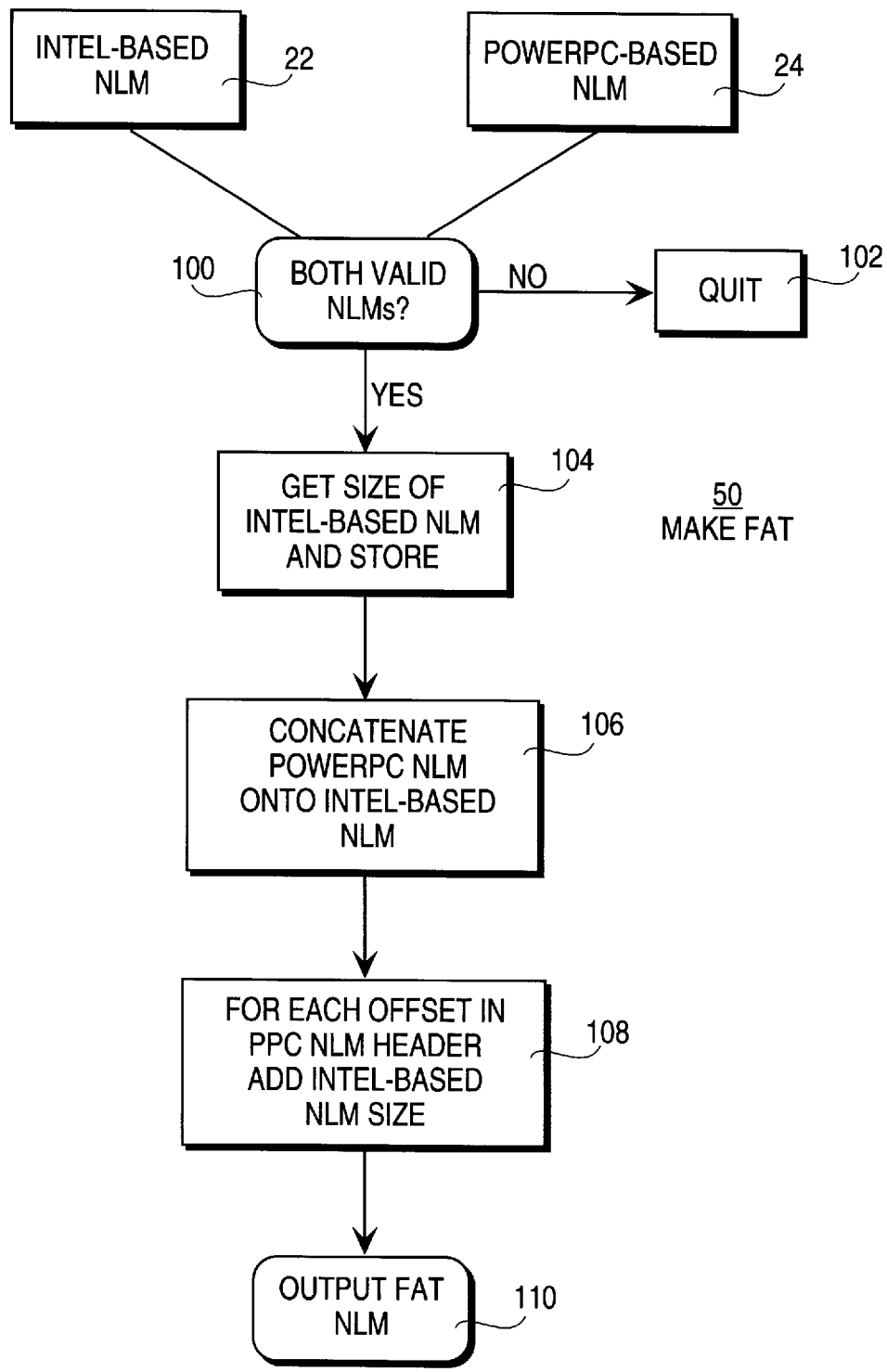
FIG. 2 illustrates the process by which an enlarged NOSLM is produced according to one embodiment of the present invention.

The present invention makes use of the structure of the typical NOSLM of FIG. 1. Referring now to FIG. 2, one method of producing an enlarged NOSLM is illustrated. In this embodiment, it is assumed that NOSLMs 22 and 24 were created using well known programming techniques and perform similar functions. NOSLM 22 has been compiled so as to be compatible with Intel-based servers and NOSLM 24 has been compiled so as to be compatible with PowerPC-based servers.

The process 50 of producing an enlarged NOSLM begins at step 100 where both NOSLM 22 and NOSLM 24 are examined to insure that both are valid NOSLMs. If not, the process quits at step 102. If both NOSLMs 22 and 24 are valid NOSLMs, the process continues at step 104 where the size of the Intel-based NOSLM 22 is determined. This size will be used later when the new offsets for the PowerPC NOSLM are calculated. The size is also stored in a known location in the new enlarged NOSLM file. It will be recognized by those skilled in the art that any unused field in the Intel-based NOSLM headers could be utilized as a storage location for this information. In a preferred embodiment, the size of the Intel-based NOSLM is stored in the reserved field following the description string in the Intel-based NOSLM header.

Once the size of Intel-based NOSLM 22 has been determined and stored, PowerPC NOSLM 24 is concatenated onto Intel-based NOSLM 22 at step 106. Conceptually, the process can be thought of as filling the machine-specific header field of PowerPC NOSLM 24 with Intel-based NOSLM 22. The MakeFat process 50 continues at step 108 where the offsets for the original PowerPC NOSLM 24 are increased by an amount equal to the size of the original Intel-based NOSLM 22. In this manner, the server which loads the enlarged NOSLM will be provided with appropriate pointers into the PowerPC NOSLM code field. Finally, MakeFat process 50 concludes at step 110 where an enlarged NOSLM is output in a single file.

In addition to the size of the Intel-based NOSLM, a "tag" created by the MakeFat process 50 is stored within the enlarged NOSLM file. This "tag" is used by PowerPC-based servers when loading NOSLMs. As will be discussed further below, the tag indicates to the server that the NOSLM is enlarged and is capable of being loaded. Preferably, the tag is stored at the end of the enlarged NOSLM file since this will be an easy address to access during the loading process. It will be apparent to those skilled in the art that any one of a number of other address locations could be used as the storage point for the tag.

Figures 3A, 3B:
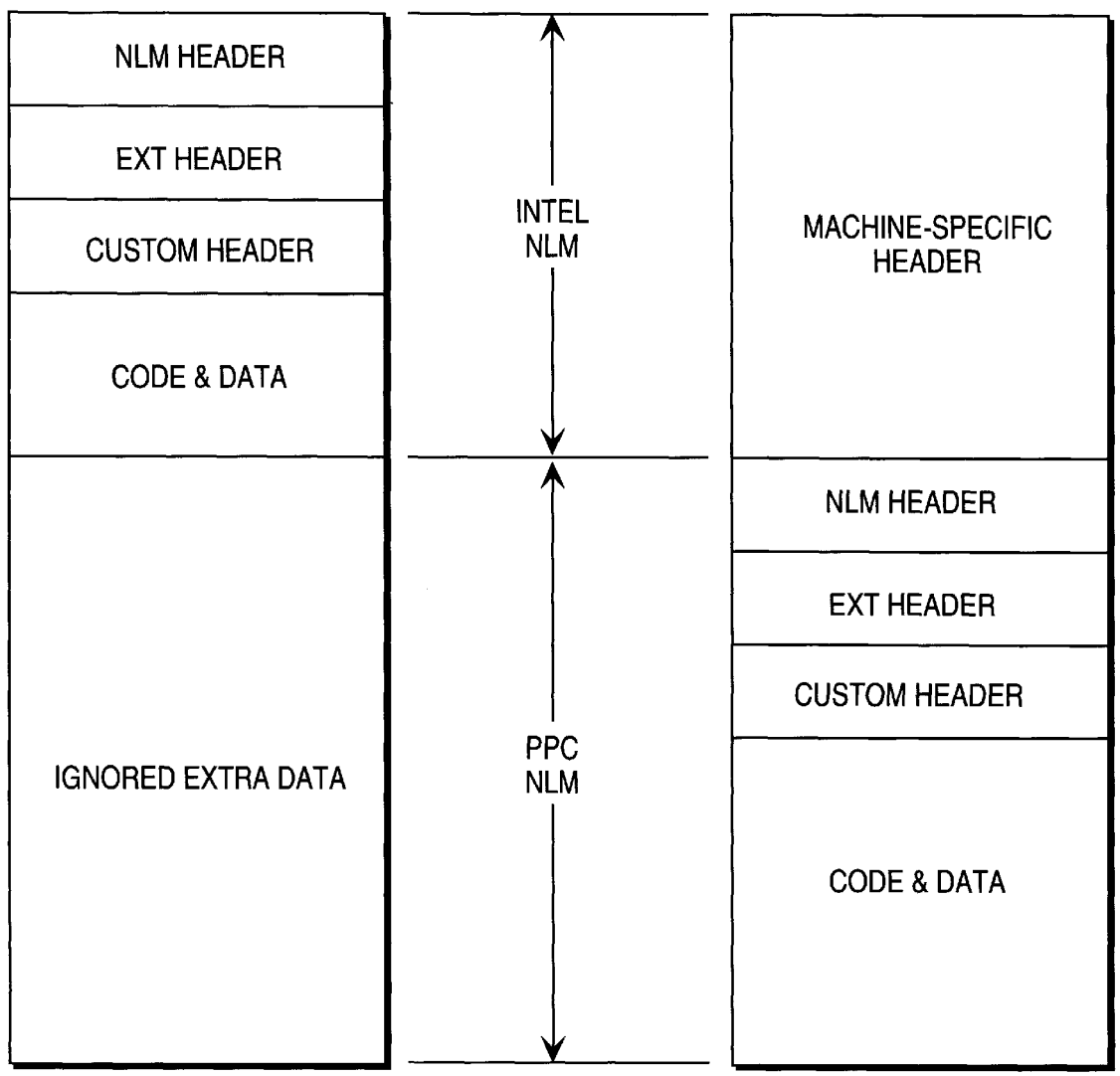
FIG. 3a illustrates an enlarged NOSLM produced by the method of the present invention as seen by an Intel-based server.
FIG. 3b illustrates an enlarged NOSLM produced by the method of the present invention as seen by a PowerPC-based server.

The enlarged NOSLM 26 produced by MakeFat process 50 is illustrated in FIGS. 3a and 3b. Both Figures show the same NOSLM 26. However, FIG. 3a shows NOSLM 26 as it is seen by an Intel-based server and FIG. 3b shows NOSLM 26 as it is seen by a PowerPC-based server. With reference to FIG. 3a, when NOSLM 26 is loaded by an Intel-based server, the loading occurs in typical fashion. During loading, the first portion of the NOSLM which is read by the server contains a "signature string". As will be apparent to those skilled in the art, the Intel-based server will interpret NOSLM 26 as a regular Intel-based NOSLM because the signature string will be the expected Intel-based NOSLM identifier. The headers will provide offsets into the Intel-based code portion of NOSLM 26 in the normal manner. The additional PowerPC NOSLM headers and data will be ignored by the Intel-based server. Thus, as far as the Intel-based server is concerned, the enlarged NOSLM is no different than a regular Intel-based NOSLM, with the exception that it occupies more space in the server's mass storage device due to the additional PowerPC NOSLM headers and code.

With reference to FIGS. 3b, the process of loading NOSLM 26 on a PowerPC-based server is described. During loading, the PowerPC server first reads the Intel-based NOSLM signature string, instead of the expected PowerPC signature string. This indicates to the server that it may be loading an enlarged NOSLM which contains two network operating system loadable modules for two different processors. To determine whether the NOSLM is truly an enlarged NOSLM (and not just an ordinary Intel-based NOSLM), the server skips to the end of the file and looks for the enlarged "tag" which would have been stored during the MakeFat process. Upon finding the tag (in the case of an enlarged NOSLM) the server reads the size of the Intel-based NOSLM which was stored in the reserved field during the MakeFat process. This is now interpreted as the size of the machine-specific header, and the server will use this value as a base offset when making all subsequent reads into the file. Consequently, the next read will be directed to the beginning of the PowerPC NOSLM header. From this point, the loader continues to load the PowerPC-based NOSLM portion of NOSLM 26 in the normal fashion.

Figure 4:
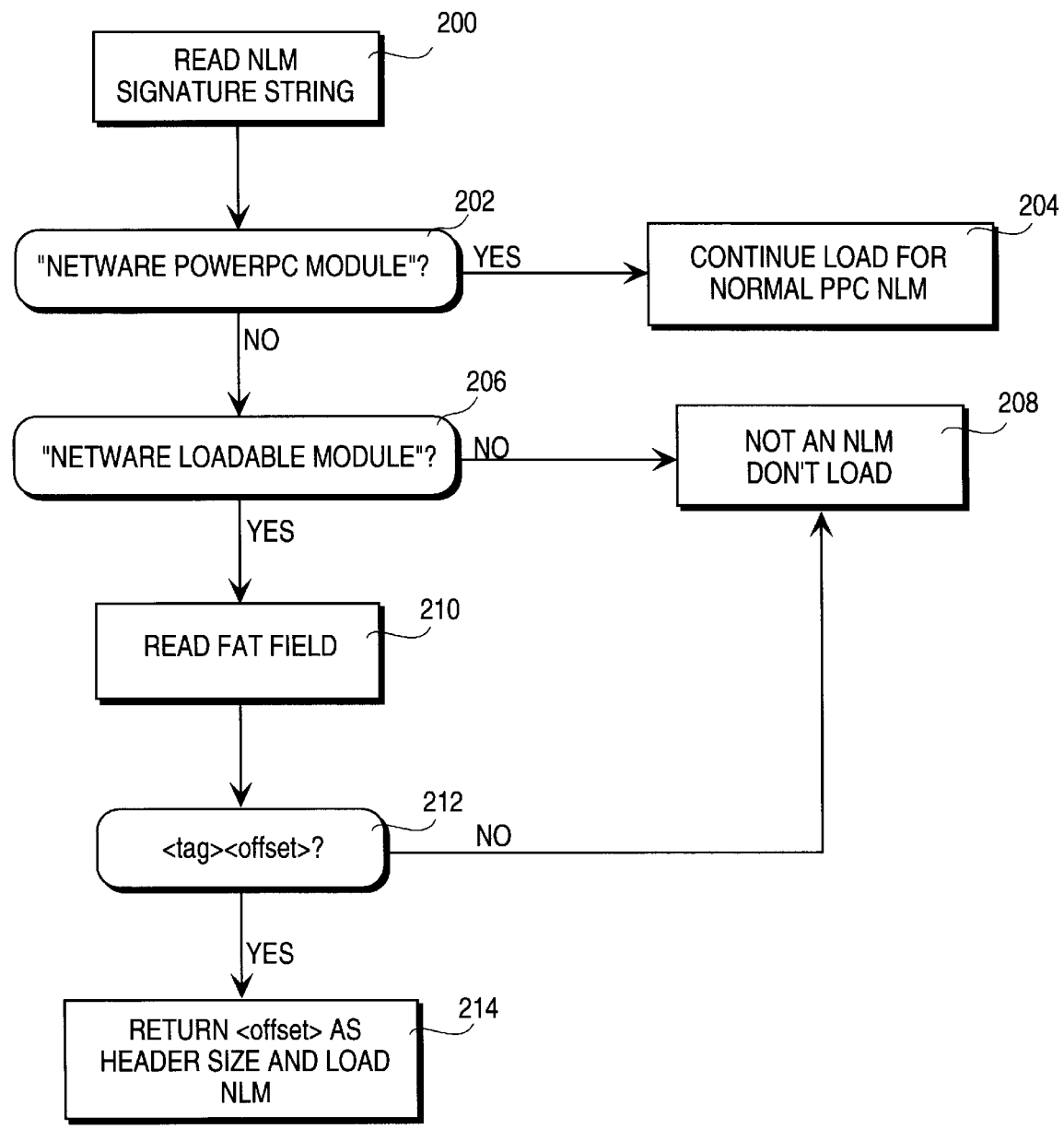
FIG. 4 illustrates the process by which an enlarged NOSLM produced in accordance with the method of the present invention is loaded by a NetWare server.

The general process followed by a PowerPC-based server in loading any NOSLM is reiterated with respect to FIG. 4 in which it is assumed that the network operating system is Novell's NetWare. As indicated, the process begins at step 200 when the NOSLM signature string is read. Then, at step 202, the server checks to see if the signature string reads "NetWare PowerPC Module". If so, the server recognizes the NOSLM as an ordinary PowerPC NOSLM and the loading process continues at step 204 with the PowerPC NOSLM being loaded in typical fashion.

In the event that the signature string was not read as "NetWare PowerPC Module" at step 202, the loading process goes on to step 206 where the server checks to see if the signature string reads "NetWare Loadable Module". If not, the loading process quits at step 208. It will be recognized by those skilled in the art that if this first read did not return a valid signature string, i.e., a string which reads "NetWare Loadable Module" or "NetWare PowerPC Module", the file is not an NOSLM.

If step 206 confirms that the signature string reads "NetWare Loadable Module", the server will recognize that the NOSLM being loaded may be enlarged. To determine whether it is enlarged, the loading process moves to step 210 where the server reads the field where the MakeFat process would have stored the enlarged tag. If the loader finds a valid tag indicating that the NOSLM was produced by a MakeFat process 50, it then skips to the field where the length of the Intel-based NOSLM is stored. This data, which will now be used as an offset, is returned at step 214 and is interpreted as the machine-specific header size. From this point, the server can skip forward to the PowerPC NOSLM portion of the enlarged NOSLM and load it. If no valid data was found at step 210, the loader recognizes that the NOSLM is not an enlarged NOSLM and the process quits.

It will be recognized by those skilled in the art that the enlarged NOSLM of the present invention may exist in a variety of forms. In one embodiment, the enlarged NOSLM is stored on a computer readable medium as executable code. In accordance with MakeFat process 50, two separate forms of executable code will be present on the storage medium; executable code for a first processor, e.g., an Intel-based processor, and executable code for a second processor, e.g., a PowerPC based processor.

Figure 5:
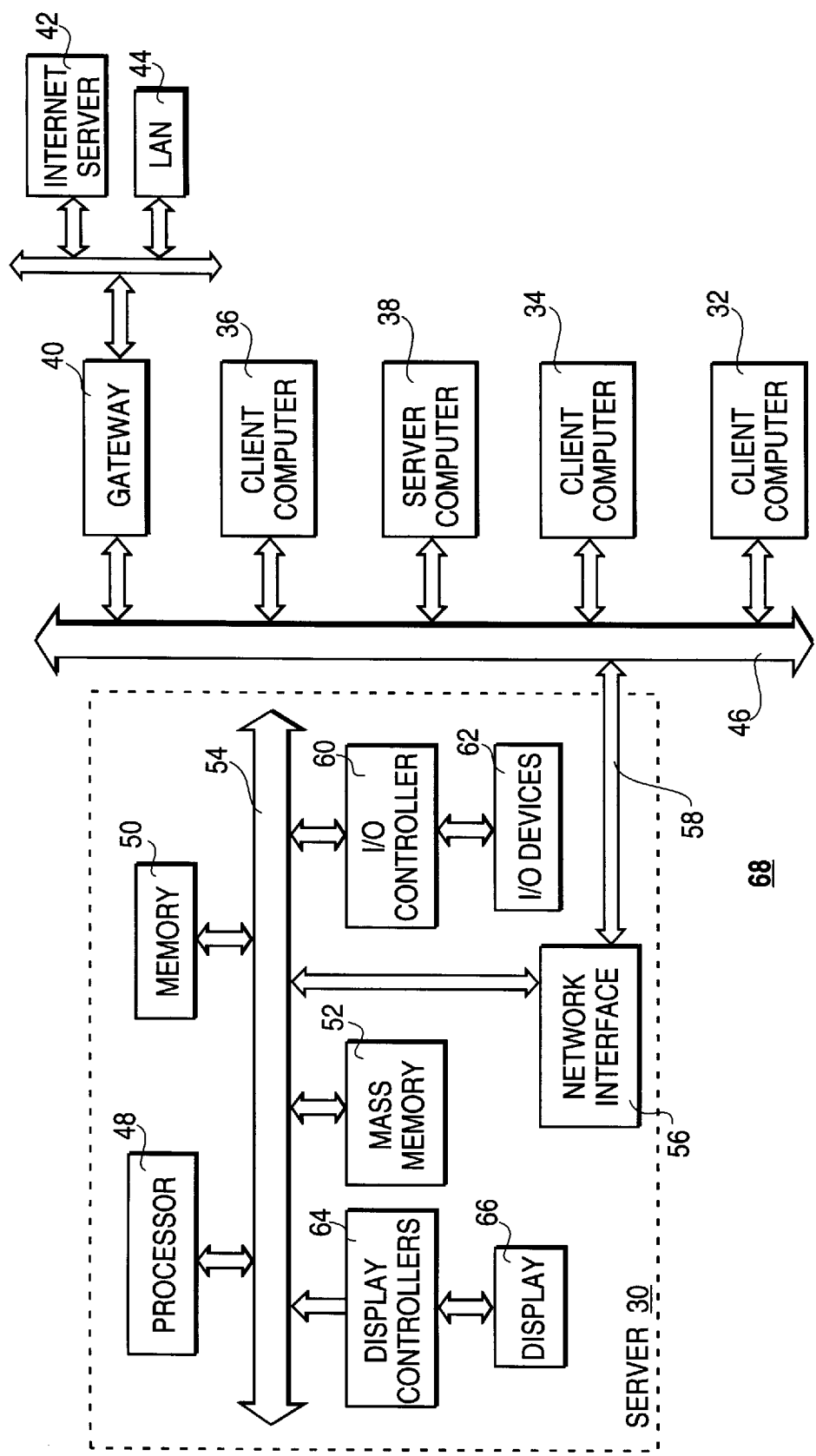
FIG. 5 shows a typical network operating system server which represents a computer system which executes a network operating system which may invoke and load a network loadable module according to the present invention.

FIG. 5 shows a typical network operating system server 30 which represents a computer system which executes a network operating system which may invoke and load a network loadable module according to the present invention. Server 30 is part of a Local Area Network 68 which is interconnected to other networks via Gateway 40. It will be recognized by those skilled in the art that Gateway 40 may be a computer system including a modem which is capable of operating as an interface between Local Area Network 68 and other networks such as LAN 44. Gateway 40 may also act as an interface between Local Area Network 68 and an Internet Server 42. In this manner, Local Area network 68 might gain access to the well known system of interconnected computers known as the "Internet".

Local Area Network 68 includes server 30 as well as several client computers 32, 34 and 36. Local Area Network 68 may also include a second server computer 38. Server 30 is coupled to the other computers 32–38 comprising Local Area Network 68 via a network coupler 46. Network coupler 46 can be any network bus known in the art, including wires or optical fibers. The network may operate pursuant to any one of a number of well known networking standards such as Local Talk (TM), EtherNet, etc.

The network server computer system 30 includes a processor 48; a memory 50; and a computer readable medium, e.g., a hard disk drive or a floppy disk, 52, each of which are generally coupled together through a bus 54. Typically, the server 30 will also include input and output devices 62 and a display 66. These devices are coupled to the bus 54 via I/O controller 60 and display controller 64, respectively. The server 30 is coupled to the other computer systems in Local Area Network 68 via network interface 56. Server computer 38 and client computers 32, 34 and 36 will contain similar devices.

In accordance with one embodiment of the present invention, the computer readable medium 52 stores a computer program which has code capable of being executed by one type of processor, e.g., an Intel-based processor, and code capable of being executed by a second type of processor, e.g., a PowerPC based processor, concatenated together. The two portions of executable code are network loadable modules for the operating system running on server 30 and server 30 utilizes a processor 48 capable of reading at least one of these forms of executable code.

In operation, the server 30 loads the compatible executable code stored on the mass storage device 52 into memory 50 utilizing a process similar to that described above. This loading may be carried out due to a request by any of client computers 32, 34 or 36. Subsequently processor 48 executes the instructions represented by the code.

It will be recognized that, in accordance with the present invention, server 30 might use one type of processor 48, while server 38 utilizes a second type of processor. For example, processor 48 of server 30 might be an Intel-based processor while server 38 might use a PowerPC based processor. Server 38 might represent a back-up server computer that will take over network operations in the event server 30 fails or is taken off-line for maintenance. The enlarged NOSLM of the present invention is capable of being loaded by both server 30 and server 38 since it is comprised of executable code recognizable by both types of processors.

Thus, a method of producing an enlarged NOSLM which can be loaded by both Intel-based and PowerPC-based NetWare servers has been described. Although the present invention has been described with specific reference to a number of details of the preferred embodiment and with reference to FIGS. 1 through 4, it will be apparent to those skilled in the art that a number of modifications and various variations may be employed without departure from the scope and spirit of the present invention.

What is claimed is:

1. A method for making a software module, said method comprising the steps of:

combining a Network Operating System Loadable Module (NOSLM) suitable for loading by a PowerPC-based computer system having a first length with a NOSLM suitable for loading by an Intel-based computer system having a second length to produce a single file, said single file capable of being loaded by said PowerPC-based computer system and said Intel-based computer system.

2. The method of claim 1 wherein the step of combining is performed by concatenating said NOSLM suitable for loading by said PowerPC-based computer system onto said NOSLM suitable for loading by said Intel-based computer system.

3. The method of claim 2 further comprising the step of storing said second length of said NOSLM suitable for loading by said Intel-based computer system in an otherwise unused field within said single file, said second length to be used as an offset by said PowerPC-based computer system when loading said single file.

4. The method of claim 2 further comprising the step of determining whether said NOSLM suitable for loading by said PowerPC-based computer system and said NOSLM suitable for loading by said Intel-based computer system are both valid NOSLMs before performing said step of concatenating.

5. The method of claim 3 further comprising the step of storing a tag at a known location within said single file, said tag indicating to said PowerPC-based computer system that said single file is an enlarged NOSLM.

6. A method for making a software module, said method comprising the steps of:

concatenating a Network Operating System Loadable Module (NOSLM) suitable for loading by a PowerPC-based computer system having a first length with a NOSLM suitable for loading by an Intel-based computer system having a second length to produce a single file said single file capable of being loaded by said PowerPC-based computer system and said Intel-based computer system; and storing said second length of said NOSLM suitable for loading by said Intel-based computer system in an otherwise unused field within said single file, said second length to be used as an offset by said PowerPC-based computer system when loading said single file.

7. The method of claim 6 further comprising the step of determining whether said NOSLM suitable for loading by said PowerPC-based computer system and said NOSLM suitable for loading by said Intel-based computer system are both valid NOSLMs before performing said step of concatenating.

8. The method of claim 6 further comprising the step of storing a tag at a known location within said single file, said tag indicating to said PowerPC-based computer system that said single file is an enlarged NOSLM.

9. A method of loading a software module onto a PowerPC-based computer system, said method comprising the steps of:

reading a Network Operating System Loadable Module (NOSLM) signature string included within said software module;

determining whether said NOSLM signature string corresponds to a NOSLM suitable for loading by said PowerPC-based computer system and, if so, loading said NOSLM;

determining whether said NOSLM signature string corresponds to a NOSLM suitable for loading by an Intel-based computer system and, if so, determining whether said NOSLM is an enlarged file, said enlarged file including said NOSLM suitable for loading by said PowerPC based computer system having a first length and said NOSLM suitable for loading by said Intel-based computer system having a second length; and loading said NOSLM if said NOSLM is an enlarged file by using said second length as an offset or, otherwise, not loading said NOSLM.

10. The method of claim 9 wherein said step of determining whether said NOSLM is an enlarged file is performed by reading a known field to determine if data stored at said known field indicates that said NOSLM is an enlarged file.

11. A computer readable medium containing a computer program having executable code for a first processor and having executable code for a second processor, said computer program comprising:

a first Network Operating System Loadable Module (NOSLM) having a first length, said first NOSLM suitable for loading by a PowerPC-based processor; and a second NOSLM having a second length and being concatenated with said first NOSLM in a single file, said second NOSLM suitable for loading by an Intel-based processor said single file capable of being loaded by said PowerPC-based processor and said Intel-based processor.

12. A computer readable medium as in claim 11, wherein said second NOSLM is stored in an otherwise unused field in said single file, and said second length is used as an offset by said PowerPC-based processor when loading said single file.

13. A network server comprising:

a processor;

a memory coupled to said processor through a bus;

a computer readable medium coupled to said memory, said computer readable medium storing a computer program having executable code for a first processor and having executable code for a second processor, said computer program comprising:

a first Network Loadable Module (NOSLM) for a network operating system, said first NOSLM suitable for loading by a PowerPC-based processor; and a second NOSLM for said network operating system, said second NOSLM being concatenated with said first NOSLM in a single file, said second NOSLM suitable for loading by an Intel-based processor, said single file capable of being loaded by said PowerPC-based processor and said Intel-based processor.

14. A network server as in claim 13, wherein said network operating system is a version of NetWare.

* * * * *